(12) United States Patent
Rule

(10) Patent No.: US 9,556,322 B2
(45) Date of Patent: Jan. 31, 2017

(54) LIQUID PIGMENT DISPERSIONS

(71) Applicant: ColorMatrix Holdings, Inc., Berea, OH (US)

(72) Inventor: Mark Rule, Roswell, GA (US)

(73) Assignee: ColorMatrix Holdings, Inc., Berea, OH (US)

( * ) Notice: Subject to any disclaimer, the term of this patent is extended or adjusted under 35 U.S.C. 154(b) by 0 days.

(21) Appl. No.: 14/911,567

(22) PCT Filed: Aug. 1, 2014

(86) PCT No.: PCT/US2014/049363
§ 371 (c)(1),
(2) Date: Feb. 11, 2016

(87) PCT Pub. No.: WO2015/023454
PCT Pub. Date: Feb. 19, 2015

(65) Prior Publication Data
US 2016/0185933 A1  Jun. 30, 2016

Related U.S. Application Data

(60) Provisional application No. 61/865,530, filed on Aug. 13, 2013.

(51) Int. Cl.
| | | |
|---|---|---|
| *C08K 3/00* | (2006.01) | |
| *C09C 1/32* | (2006.01) | |
| *C09C 1/36* | (2006.01) | |
| *C08K 5/521* | (2006.01) | |

(52) U.S. Cl.
CPC ............ *C08K 3/0033* (2013.01); *C08K 5/521* (2013.01); *C09C 1/32* (2013.01); *C09C 1/36* (2013.01)

(58) Field of Classification Search
CPC ............ C09C 1/32; C09C 1/36; C08K 5/521; C08K 3/0033
See application file for complete search history.

(56) References Cited

U.S. PATENT DOCUMENTS

| | | |
|---|---|---|
| 4,174,340 A | 11/1979 | Luders et al. |
| 4,209,430 A | 6/1980 | Weber |
| 4,251,436 A | 2/1981 | Silberberg et al. |
| 4,746,462 A | 5/1988 | Nakamura et al. |
| 5,318,625 A | 6/1994 | Stramel |
| 5,466,482 A | 11/1995 | Johnson |
| 5,837,049 A | 11/1998 | Watson et al. |
| 6,562,897 B1 | 5/2003 | Thetford |
| 6,765,041 B1 | 7/2004 | El-Shoubary et al. |
| 6,786,956 B2 | 9/2004 | Ichikawa |
| 6,825,231 B2 | 11/2004 | Heinelt et al. |
| 7,387,795 B2 | 6/2008 | Hollenberg et al. |
| 7,592,378 B2 | 9/2009 | Lin et al. |
| 7,905,955 B2 | 3/2011 | Fechner et al. |
| 8,221,537 B2 | 7/2012 | Fechner et al. |
| 8,221,538 B2 | 7/2012 | Fechner et al. |
| 8,372,929 B2 | 2/2013 | Fechner et al. |
| 2002/0139280 A1* | 10/2002 | Ichikawa ............... C09D 11/18 106/31.43 |
| 2003/0144399 A1 | 7/2003 | Matta et al. |
| 2004/0138334 A1* | 7/2004 | Rosenbaum ........... C09D 11/16 523/160 |
| 2007/0207927 A1* | 9/2007 | Rosa ....................... A01C 1/06 504/100 |

FOREIGN PATENT DOCUMENTS

| | | |
|---|---|---|
| JP | 6-84484 | 10/1994 |
| WO | WO 2011/130299 A2 * | 10/2011 |

OTHER PUBLICATIONS

Clariant International Ltd., "Process aids for the Chemical Industry," Surfactants, Jan. 2009, 27 pages, EBR 5275 Jan. 2009, Switzerland.
Akzo Nobel Surface Chemistry LLC, "Technical Information, Surface Chemistry," HLB & Emulsification, 2011, 15 pages, Publication SC-11-02, Chicago, Illinois.
Rhodia Novecare, "Industrial Formulations," Performance additives, Feb. 2009, 12 pages, France.

* cited by examiner

*Primary Examiner* — Anthony J Green
(74) *Attorney, Agent, or Firm* — John H. Hornickel

(57) ABSTRACT

The present invention provides fluid compositions comprising at least one hydrophobic liquid, at least one inorganic pigment, and at least one compatibilization agent comprising at least one phosphate monoester.

14 Claims, No Drawings

LIQUID PIGMENT DISPERSIONS

CLAIM OF PRIORITY

This application claims priority from U.S. Provisional Patent Application Ser. No. 61/865,530 filed on Aug. 13, 2013, which is incorporated by reference.

FIELD OF THE INVENTION

This invention discloses compositions comprising liquid dispersions of inorganic pigments that have improved stability, especially at elevated temperature such as those employed in polymer processing and particularly, although not exclusively, relates to compositions which have improved processing characteristics and improved dispersion of pigments in polymers in injection molding and extrusion blow molding processes. Preferred embodiments relate to the manufacture of containers, for example, beverage containers.

BACKGROUND OF THE INVENTION

Polymers are widely employed to produce functional and decorative articles. These articles are predominantly produced via a melt forming process, such as injection molding, extrusion molding, extrusion blow molding, thermoforming, or 3D printing. Pigments or dyes are often added to the polymers to provide desirable visual or functional effects, including but not limited to, opacity, light barrier, colors, or pearlescence or other special effects. These pigments or dyes are most frequently added to the polymers during the melt processing operation in the form of a masterbatch or concentrate, rather than added as individual ingredients to the polymer during polymer resin manufacture or melt-mix compounding.

There are two predominant methods to add pigments or dyes to polymers during melt processing. In the first method, a solid "masterbatch" color concentrate is produced, wherein the dry pigments or dyes are melt compounded into a polymer resin at a high concentration, and the masterbatch is then pelletized. The masterbatch pellets are subsequently blended with unpigmented "natural" resin pellets and perhaps other ingredients, and the mixture subjected to the molding process to produce the desired article. Typical pigment concentrations in a masterbatch range from 2-50%, and in the final article can range from 0.001 to 5%.

A second method is to add the pigments or dyes directly to the polymer during melt processing. In this method, the pigments are typically first dispersed in a liquid compatible with the polymer being processed, and the liquid dispersions are metered into the melt process at a predetermined rate in order to achieve the desired pigment level in the final article. The liquid employed is often referred to as a "vehicle" or "carrier." Typical pigment concentrations in a liquid dispersion range from 30-70%, and in the final article can range from 0.001 to 5%. In general, adding pigments via liquid dispersions during melt processing is the more economical process.

Because of the difficulty of achieving good dispersions of dry pigments in a liquid or in a polymer matrix, dispersion aids are often employed. Generally, the function of the dispersion aids is to improve the compatibility/wettability of the dry hydrophilic pigment with the more hydrophobic polymer or liquid. The need for such compatibilization is greatest where the pigments are highly hydrophilic and the polymer and/or liquid are highly hydrophobic. Examples of such hydrophilic/hydrophobic combinations that benefit from compatibilization include, but are not limited to, titanium dioxide in polyethylene, iron oxides in polypropylene, and micas in polyethylene. When compatibilization is insufficient, clumping of pigment particles is common, which results in visual and functional imperfections such as speckling, streaking, inhomogeneous coloring, and the like.

While compatibilization of the pigment with the polymer matrix is desirable regardless of the method used to add the pigments, the need for compatibilization is more acute in the case of liquid dispersions. The increased requirement for compatibilization with liquid dispersions arises because there is generally less time in the polymer melt for mixing to occur, the melt processing conditions utilized to manufacture articles are less aggressive that those available for melt compounding of masterbatches, the liquid/polymer ratios employed are generally much lower than the masterbatch/polymer ratios, and there are limits to how much liquid can be added to the polymer melt without adversely affecting the polymer's processability or physical performance properties. A further constraint for liquid pigment dispersions is that the pigment dispersions need to be substantially stable to settling and yet must be fluid enough to be pumped through narrow-gauge tubing and other equipment. In addition, the compatibilization agent/pigment must be thermally and hydrolytically stable, so that loss of compatibilization does not occur in heating the liquid dispersion up to the polymer processing temperature, and compatibilization is not lost under conditions of extended storage.

For polymer, pigment, and processing conditions that are less demanding, state of the art compatibilization is sufficient, and liquid pigment dispersions are the preferred method of incorporating pigments into polymeric articles. Examples of such less demanding conditions include, for example, polyester (PET) injection molding with titanium dioxide pigments using ethoxylated sorbitan trioleate as a compatibilizer. Conversely, for more demanding applications, such as extrusion blow molding of polyolefins, the dominant method for incorporating pigments is via masterbatches.

SUMMARY OF THE INVENTION

Because adding liquid dispersions of pigments is inherently more economical, it would be an advance in the state of the art to develop liquid pigment dispersions with improved compatibilization so that liquid pigment dispersions could be employed in these more demanding applications. It would be a further advance in the state of the art to develop liquid pigment dispersions that remained sufficiently fluid even at very high pigment loadings.

Concordant and congruous with the present invention, compatibilizers that provide fluid, stable, high solids dispersions of inorganic pigments in hydrophobic oils has surprisingly been discovered to solve these problems with liquid pigment dispersions.

The present invention discloses compositions comprising inorganic pigments treated with phosphate monoesters derived from hydrolytically stable non-ionic surfactants and dispersed in fluid, hydrophobic media. The phosphate monoesters of the present invention are themselves soluble in the hydrophobic media. Stable, fluid dispersions are obtained when the ester group possesses more than about 18 carbon atoms and has a hydrophilic/lipophilic balance (HLB) similar to the fluid media. Compatibilized liquid pigment dispersions of the present invention are suitable for pigmenting polymer melts in demanding applications, including for example, extrusion blow molding.

One aspect of the invention is a fluid composition comprising at least one hydrophobic liquid, at least one inorganic pigment, and at least one phosphate monoester compatibilizer.

In the context of this invention, "fluid" means a liquid having a viscosity in a range from about 0.01 Poise to about 500 Poise and preferably from about 0.1 Poise to about 300 Poise at temperatures from about 10° C. to about 50° C. and preferably from about 20° C. to about 35° C.

EMBODIMENTS OF THE INVENTION

Compatibilization

In the context of this invention, "compatibilization" means chemically modifying the surfaces of the at least one inorganic pigment such that the pigment particles are chemically similar to the carrier or vehicle, so that the attractive forces between the particles can easily be disrupted by the vehicle and agglomerates of particles are readily dispersed in the vehicle.

A number of compatibilization agents have been developed for solid masterbatches. For example, Watson et al. in U.S. Pat. No. 5,837,049 disclose the use of alkylphosphonic acids with 6-22 carbon atoms as a compatibilizer for particulate inorganic solids for the preparation of polymer masterbatches. El-Shoubary et al. in U.S. Pat. No. 6,765,041 and U.S. Pat. No. 6,825,231 disclose polymer matrix compositions comprising a) an inorganic pigment that has been treated with an organo-acid phosphate having between 2 and 22 carbon atoms, and b) a polymer, wherein the polymer matrix has an essential absence of water and organic solvents. Luders et al. in U.S. Pat. No. 4,174,340 disclose use of alkyl and vinyl phosphonic acids as adhesion promoters for inorganic fillers in polyolefins. Silverberg et al. in U.S. Pat. No. 4,251,436 disclose the use of organic phosphates and pyrophosphates as compatibilizers for inorganic fillers in polyolefins. Stramel in U.S. Pat. No. 5,318,625 disclose treating inorganic pigments such as titanium dioxide with organophosphate esters. Weber in U.S. Pat. No. 4,209,430 discloses treating inorganic pigments with the reaction products of $PCl_3$ and fatty acid mixtures. In all of these disclosures, the phosphorus-containing compatibilizer is coated onto the inorganic pigment as either a neat liquid or as a solution in a low boiling solvent, which is subsequently removed before the dry treated pigment is compounded with a thermoplastic polymer.

Hollenberg et. al. in U.S. Pat. No. 7,387,795 disclose cosmetic compositions containing pigment powders that have been surface treated with organophosphonic acid compounds and subsequently dispersed in water/oil emulsions or waxes. The dispersions of the invention are not stable in oil alone, as evidenced by sedimentation of the pigments over time when suspended in a hydrophobic oil. In their specification octylphosphonic acid was the only phosphonic acid utilized.

Nakamura et al (EU Application 86101684.8) and Thetford (U.S. Pat. No. 6,562,897) disclose organic phosphate esters based on polymers of hydroxycarboxylic acids) as dispersants for pigments. Neither specification recognizes the importance of maximizing the content of phosphate monoester nor the need to match the HLB value of the organic phosphate esters to the HLB of the liquid medium. Furthermore, the poly(hydroxycarboxylates) of these disclosures are inherently hydrolytically unstable, especially in the presence of acidic functionalities such as organophosphoric acids.

None of the above documents disclose or suggest the use of phosphate monoesters to provide stable, fluid dispersions of inorganic pigments in a hydrophobic liquid, or that such dispersions are suitable for use in high temperature polymer processing applications such as injection molding and extrusion molding.

It has now been found, unexpectedly, that fluid, high solids, stable dispersions of inorganic pigments can be readily prepared in a hydrophobic liquid by combining the selected pigments and the hydrophobic liquid, (e.g., an oil) along with low levels of phosphate monoesters and blending/mixing using standard techniques for liquid dispersion processing. The order of addition is not critical.

The amount of pigment or pigments can range from about 1 to about 90 and preferably from about 30 to about 85 weight percent based on the weight of the oil or other hydrophobic liquid.

Only small amounts of phosphate monoester are required to achieve the desired amount of compatibilization. In general, the amount of compatibilizer added should be at least enough to achieve complete coverage of the surfaces of the pigment particles with a monolayer of phosphate monoester. The amount required will depend on the total amount of pigment(s), the specific surface area of the pigment(s), the mole fraction of monoester present in the phosphate ester composition, the molecular weight of the phosphate monoester, and the surface coverage of each phosphate monoester. Typical amounts of phosphate monoesters required are in the range of 0.25% to 5 wt % (1:400 to 1:20) based on the weight of pigment. Preferred amounts are in the range of 0.5% to 2 wt % (1:200 to 1:50) based on the weight of pigment. At lower loadings compatibilization can be incomplete, while loadings higher than that necessary to achieve sufficient compatibilization provide little additional benefit.

Phosphate Monoesters

Phosphate monoesters of the present invention can be added as pure compounds, or they can be components of a mixture that includes phosphate diesters and triesters. In general, phosphate diesters and triesters are much less effective in providing compabilization. Therefore compositions that are rich in phosphate monoesters are preferred. In a preferred embodiment, the phosphate monoesters are provided and used in the free acid form. In another embodiment, the phosphate monoesters can be partially or fully neutralized with an organic or inorganic base. In order to possess sufficient thermal and hydrolytic stability, the phosphate esters of the present invention can be substantially free of carboxylic ester linkages. Preferred phosphate monoesters may be derived by reaction of a suitable phosphoric acid precursor with a polyether-based non-ionic surfactant.

While not bound by and particular theory, it is believed that the phosphate monoesters used in the present invention are effective as compatibilizers because the phosphate portion of the molecule has a very high affinity for inorganic oxides and hydroxides, and chemically reacts with the surface of pigments containing these chemical moieties. Upon reaction, the pigment particles acquire the chemical characteristics of the organic ester tail of the phosphate, which generally extends away from the surface into the surrounding medium.

In order for the compatibilized pigment particles to be fluid in a hydrophobic liquid, the phosphate ester is preferably miscible with the liquid. To achieve this, the solubility parameters of the ester portion of the phosphate monoester should be similar to the liquid. An empirical measure of solubility parameters is the hydrophilic/lipophilic balance, or HLB. Thus, selecting phosphate esters whose ester functionality has an HLB value similar to the selected liquid provides a direct method to achieve fluidity even at high pigment loadings.

In addition to having similar HLB values, it is preferred that the length of the phosphate ester group (as measured by the number of atoms linked together) be long enough to achieve entanglement with the molecules in the liquid. Thus chain lengths greater than 18 atoms are preferred, and more preferred are chain lengths greater than about 22 atoms.

In one embodiment, the desired HLB value for the compatibilized pigment is obtained utilizing a single phosphate ester composition. In another embodiment, the desired HLB value is obtained by utilizing two or more phosphate ester compositions which have a weighted average HLB similar to the HLB of the liquid. Similarly, the hydrophobic liquid can comprise a single chemical, or be a mixture of chemicals whose weighted average HLB is similar to the HLB or HLB average of the compatibilized pigment(s).

Optional Additives

Liquid dispersions of the present invention can include conventional plastics additives in an amount that is sufficient to obtain a desired processing or performance property for the dispersion. The amount should not be wasteful of the additive nor detrimental to the processing or performance of the dispersion. Those skilled in the art of thermoplastics mixing, without undue experimentation but with reference to such treatises as *Plastics Additives Database* (2004) from Plastics Design Library (Elsevier.com), can select from many different types of additives for inclusion into the dispersions of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Processing

The preparation of dispersions of the present invention is uncomplicated. The dispersion of the present can be made in batch or continuous operations.

Mixing in a batch or continuous process typically occurs in a batch mixer or a continuous mixer, respectively, operating at ambient temperature with addition of the solid ingredients into the liquid concurrently or sequentially. Mixing speeds can range from about 1 to about 10,000 revolutions per minute (rpm), and preferably from about 20 to about 6000 rpm. Typically, the output from the mixer is the liquid dispersion ready for storage and use.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (Elsevier.com), one can make articles of any conceivable shape and appearance using dispersions of the present invention mixed into polymer resin(s) and optionally other ingredient(s).

Dilution or "let down" ratios of the liquid pigment dispersions into the polymer resin can range from about 0.001 to about 5% and preferably from about 0.01 to about 2.5%, in order to achieve the desired match of color in the polymer compound to a color standard or other previous determination made. All aspects of the science of color matching can be employed with the liquid pigment dispersions of the present invention.

USEFULNESS OF THE INVENTION

Any desired polymer article of a final shape made via injection molding, extrusion molding, extrusion blow molding, thermoforming, or 3D printing is a candidate to benefit from the use of liquid pigment dispersions of this invention.

More specifically, the liquid pigment dispersions can be used with polymers which under the most strenuous of polymer processing, such as extrusion blow molding, where short residence times, limiting shearing, and high throughputs make it difficult for traditional liquid dispersions to succeed without encountering screw slippage and incompletely dispersed pigment.

The difficulties with delivery of pigment particles via a liquid delivery system through small diameter tubing is now minimized because the pigment particles have been compatibilized with, and to flow smoothly within, the liquid carrier, with little or no tendency to agglomerate, even at elevated temperatures.

The following examples also demonstrate the practice of this invention. Concentrations are all expressed as weight percent unless otherwise noted.

EXAMPLES

Example 1

The following phosphate esters were obtained from Rhodia:

Rhodafac PA23, a phosphate monoester rich composition where the phosphate ester functionality is an ethoxylated C10-C14 alcohol with a HLB of 11.2 and an estimated chain length of 30.

Rhodafac PA35, a phosphate monoester rich composition where the phosphate ester functionality is an ethoxylated oleyl alcohol with a HLB of 5.7 and an estimated chain length of 27.

Rhodafac LB400, a phosphate monoester rich composition where the phosphate ester functionality is an ethoxylated oleyl alcohol with a HLB of 5.7 and an estimated chain length of 27.

Rhodafac RA600, a phosphate monoester rich composition where the phosphate ester functionality is an ethoxylated C8-C10 alcohol with a HLB of ~5.2 and an estimated chain length of 14.

Rhodafac RS/710, a phosphate monoester rich composition where the phosphate ester functionality is an ethoxylated tridecyl alcohol with a HLB of ~9.6 and an estimated chain length of ~27.

Rhodafac MB, a phosphate ester composition rich in di and tri esters, where the phosphate ester functionality is an ethoxylated C10-C14 alcohol with a reported HLB of 9.2 and with an estimated chain length of ~27.

Rhodafac ASI 80, an 80% solution of octylphosphonic acid in ethanol/water, with an alkyl group chain length of 8 and an estimated HLB of 0.

Into eight 12 ml vials were placed 2.0 grams of titanium dioxide and 1.0 grams of heavy mineral oil with a viscosity of about 0.60 Poise. Next was added to the separate vials 0.06 grams of each of the above materials to the first seven vials; the eighth vial served as a control. The contents of each vial were stirred for 10 seconds with a spatula. The vials were then set aside for 24 hours at room temperature.

The fluidity of the contents of each vial were then measured by inverting the vial and measuring the time required for material to flow to the opposite end of the vial. The results were as follows:

Rhodafac PA 23: no flow after 2 hours
Rhodafac PA 35: <30 seconds
Rhodafac LB400: <30 seconds
Rhodafac RA600: no flow after 2 hours
Rhodafac RS/710: no flow after 2 hours
Rhodafac MB: no flow after 2 hours
Rhodafac ASI 80: no flow after 2 hours
Control: no flow after two hours The above results demonstrate that Rhodafac PA 35 and LB 400 are excellent compatibilizers which provide fluidity to a high solids hydrophobic non-polar mineral oil dispersion. Both are monoester-rich phosphate ester compositions where the ethoxylated alcohol portion of the molecule has an HLB of ~5.7 and a chain length greater than about 18 atoms. In contrast, Rhodafac PA 23 and Rhodafac RS/710, which also have long chains but possess higher HLB values showed no flow. Neither did Rhodafac RA600, which possesses a low HLB value but a shorter (14 atom) chain nor Rhodafac ASI 80, which possesses an 8 carbon chain. Rhodafac MB, which possessed long chains but low monoester content also showed no flow. The commonly accepted HLB literature value for a surfactant for a water-in-mineral oil dispersion is ~6. Please see, for example AkzoNobel, "HLB & Emulsification Description of Hydrophile, Lipophile Balance and use of HLB in Producing Emulsions" (2011).

Thus, in addition to the Rhodafac PA 35 and LB 400 phosphate esters, other chemicals with an HLB value of about 5.5-6.5 and a carbon chain length of greater than about 18 atoms would also qualify as candidates for use in this invention with a heavy mineral oil as the hydrophobic liquid.

Example 2

Into eight 12 ml vials were placed 2.0 grams of titanium dioxide and 1.0 grams of canola vegetable oil with a viscosity of about 0.60 Poise but also having a higher polarity than the heavy mineral oil. Next was added to the separate vials 0.06 grams of each of the above materials to the first seven vials; the eighth vial served as a control. The contents of each vial were stirred for 10 seconds with a spatula. The vials were then set aside for 24 hours at room temperature.

The fluidity of the contents of each vial were then measured by inverting the vial and measuring the time required for material to flow to the opposite end of the vial. The results were as follows:

Rhodafac PA 23: <30 seconds
Rhodafac PA 35: no flow after 2 hours
Rhodafac LB400: no flow after 2 hours
Rhodafac RA600: no flow after 2 hours
Rhodafac RS/710: <30 seconds
Rhodafac MB: no flow after 2 hours
Rhodafac ASI 80: no flow after 2 hours
Control: no flow after 2 hours The above results demonstrate that Rhodafac PA 23 and RS/710 are excellent compatibilizers which provide fluidity to a high solids hydrophobic vegetable oil dispersion. Both are monoester-rich phosphate ester compositions where the ethoxylated alcohol portion of the molecule has an HLB of ~9-11 and a chain length greater than 18 atoms. In contrast, Rhodafac PA 35 and Rhodafac LB400, which also have long chains but possess lower HLB values showed no flow. The change in preferred compatibilizer between the nonpolar mineral oil and more polar canola vegetable oil demonstrates the importance of matching the HLB of the ester functionality to the HLB of the liquid. As before, neither Rhodafac RA600, which possesses a low HLB value but a shorter (14 atom) chain nor Rhodafac ASI 80, which possesses a 8 carbon chain showed flow. Rhodafac MB, which possessed long chains and a HLB of 9.2 but low monoester content also showed no flow.

Thus, with a canola vegetable oil as the hydrophobic liquid carrier, other chemicals with an HLB value of about 9.5-11.5 and a carbon chain length of greater than about 18 atoms, and preferably 27 atoms, would also qualify as candidates for use in this invention.

Example 3

To three 12 ml vials were added 2.0 grams of titanium dioxide and 1.0 grams of heavy mineral oil with a viscosity of about 0.60 Poise. To the first vial was added 0.03 grams of Rhodafac PA 35. To the second vial was added 0.06 grams of Rhodafac PA 35. To the third vial was added 0.09 grams of Rhodafac PA 35. After mixing the contents of each vial and allowing them to sit for 12 hours, the vials were inverted and the time required for material to flow to the opposite end of the vial was recorded.

0.03 grams PA 35: no flow after 30 minutes
0.06 grams PA 35: <30 seconds
0.09 grams PA 35: <30 seconds These results show that above a threshold loading there is little advantage to higher loadings of compatibilizer above about 2 weight percent of compatibilizer to pigment.

Example 4

To three 12 ml vials were added 2.0 grams of ultramarine blue and 1.0 grams of with a viscosity of about 0.60 Poise. To the first vial was added 0.03 grams of Rhodafac PA 35. To the second vial was added 0.06 grams of Rhodafac PA 35. To the third vial was added 0.09 grams of Rhodafac PA 35. After mixing the contents of each vial and allowing them to sit for 12 hours, the vials were inverted and the time required for material to flow to the opposite end of the vial was recorded.

0.03 grams PA 35: no flow after 2 hours
0.06 grams PA 35: <30 seconds
0.09 grams PA 35: <30 seconds These results show that other pigments are compatibilized in a manner similar to titanium dioxide.

Example 5

The titanium dioxide sample containing 0.06 grams Rhodafac PA 35 from Example 3 and the ultramarine blue sample containing 0.06 grams Rhodafac PA 35 from Example 4 were placed separately onto aluminum pans and were heated in air on a hot plate to >150° C. No separation of pigment from the carrier oil was observed in either case, and both materials remained fluid.

Example 6

A liquid pigment formulation comprising 85% titanium dioxide, 2.0% Rhodafac LB 400, and 13.0% light mineral oil with a viscosity of about 0.13 Poise. was prepared and tested as a liquid colorant for HDPE in an extrusion blow molding process. Only minor specks (a sign of incomplete dispersion) were observed, and there were no issues with feeding the liquid dispersion to the molding process.

With these six Examples and the results obtained, a person having ordinary skill in the art can determine which type of phosphate monoester to use as a compatibilizer, depending on (a) HLB value of the ethoxylated alcohol portion of the phosphate monoester which is a function of the type of liquid carrier used and (b) the carbon chain length which is a function of achievement of entanglement of the compatibilizer with the molecules in the liquid.

All of the features disclosed in this specification (including any accompanying claims, abstract, and drawings), and/or all of the steps of any method or process so disclosed, can be combined in any combination, except combinations where at least some of such features and/or steps are mutually exclusive.

Each feature disclosed in this specification (including any accompanying claims, abstract, and drawings) can be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combinations, of the features disclosed in the specification (including any accompanying claims, abstract, and drawings), or the novel one, or any novel combination, of the compositions or steps of any method or process so disclosed.

The invention is not limited to the above embodiments. The claims follow.

What is claimed is:

1. A fluid composition, comprising:
   at least one hydrophobic liquid,
   at least one inorganic pigment, and
   at least one phosphate monoester compatibilizer substantially free of carboxylic ester linkages;
   wherein the weight of phosphate monoester compatibilizer to inorganic pigment is above 1.5 weight percent and less than about 4.5 weight percent,
   wherein when the hydrophobic liquid is a mineral oil with a viscosity of about 0.60 Poise, the phosphate monoester compatibilizer is a phosphate monoester rich composition where ester functionality is an ethoxylated oleyl alcohol with a hydrophilic/lipophilic balance of 5.7 and an estimated chain length of 27; and
   wherein when the hydrophobic liquid is a vegetable oil with a viscosity of about 0.60 Poise and a higher polarity than the mineral oil, the phosphate monoester compatibilizer is selected from the group consisting of (a) a phosphate monoester rich composition where phosphate ester functionality is an ethoxylated C10-C14 alcohol with a hydrophilic/lipophilic balance of 11.2 and an estimated chain length of 30 and (b) a phosphate monoester rich composition where phosphate ester functionality is an ethoxylated tridecyl alcohol with a hydrophilic/lipophilic balance of about 9.6 and an estimated chain length of about 27.

2. The fluid composition according to claim 1, wherein the composition has a viscosity less than about 500 poise at room temperature.

3. The fluid composition according to claim 1, wherein ester functionality of the phosphate monoester compatibilizer comprises a solubility parameter similar to a solubility parameter of the hydrophobic liquid.

4. The fluid composition according to claim 3, wherein the ester functionality of the phosphate monoester compatibilizer is miscible with the hydrophobic liquid.

5. The fluid composition according to claim 3, wherein the ester functionality of the phosphate monoester compatibilizer has an HLB value within +/−2 units of an HLB value of the hydrophobic liquid.

6. The fluid composition according to claim 1, wherein the inorganic pigment comprises particles whose surface comprises metal oxides or hydroxides.

7. The fluid composition according to claim 1, wherein the hydrophobic liquid comprises more than one chemical species.

8. The fluid composition according to claim 1, wherein the phosphate monoester compatibilizer is provided and used in free acid form.

9. The fluid composition according to claim 2, wherein ester functionality of the phosphate monoester compatibilizer comprises a solubility parameter similar to a solubility parameter of the hydrophobic liquid.

10. The fluid composition according to claim 9, wherein the ester functionality of the phosphate monoester compatibilizer is miscible with the hydrophobic liquid.

11. The fluid composition according to claim 9, wherein the ester functionality of the phosphate monoester compatibilizer has an HLB value within +/−2 units of an HLB value of the hydrophobic liquid.

12. The fluid composition according to claim 2, wherein the inorganic pigment comprises particles whose surface comprises metal oxides or hydroxides.

13. The fluid composition according to claim 2, wherein the hydrophobic liquid comprises more than one chemical species.

14. The fluid composition according to claim 2, wherein the phosphate monoester compatibilizer is provided and used in free acid form.

* * * * *